(12) United States Patent
Sackett

(10) Patent No.: US 8,696,046 B2
(45) Date of Patent: Apr. 15, 2014

(54) TAILGATE HINGE RETAINING MECHANISM

(75) Inventor: Jay Leonard Sackett, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 13/450,527

(22) Filed: Apr. 19, 2012

(65) Prior Publication Data

US 2013/0278004 A1 Oct. 24, 2013

(51) Int. Cl.
*B62D 33/037* (2006.01)

(52) U.S. Cl.
USPC ............................................ 296/50; 296/57.1

(58) Field of Classification Search
USPC ............. 296/50, 57.1; 49/386, 388, 339, 389; 16/255, 260–262
See application file for complete search history.

(56) References Cited

U.S. PATENT DOCUMENTS

| 5,415,058 | A | 5/1995 | Young et al. |
| 5,823,022 | A | 10/1998 | Barker |
| 5,857,738 | A | 1/1999 | Hamilton |
| 7,549,691 | B2 | 6/2009 | Schulte et al. |
| 2004/0207224 | A1* | 10/2004 | Miller et al. .................... 296/21 |

* cited by examiner

*Primary Examiner* — Dennis Pedder
*Assistant Examiner* — Beverly Becker
(74) *Attorney, Agent, or Firm* — Gifford, Krass, Sprinkle, Anderson & Citkowski, P.C.

(57) ABSTRACT

A tailgate hinge retaining mechanism for a truck bed. The retaining mechanism can have a post bracket and a tailgate bracket. A retaining bracket is also included and attached to the tailgate bracket, the retaining bracket having a sleeve with an offset slot that prevents the tailgate bracket from being undesirably removed from the post bracket.

19 Claims, 4 Drawing Sheets

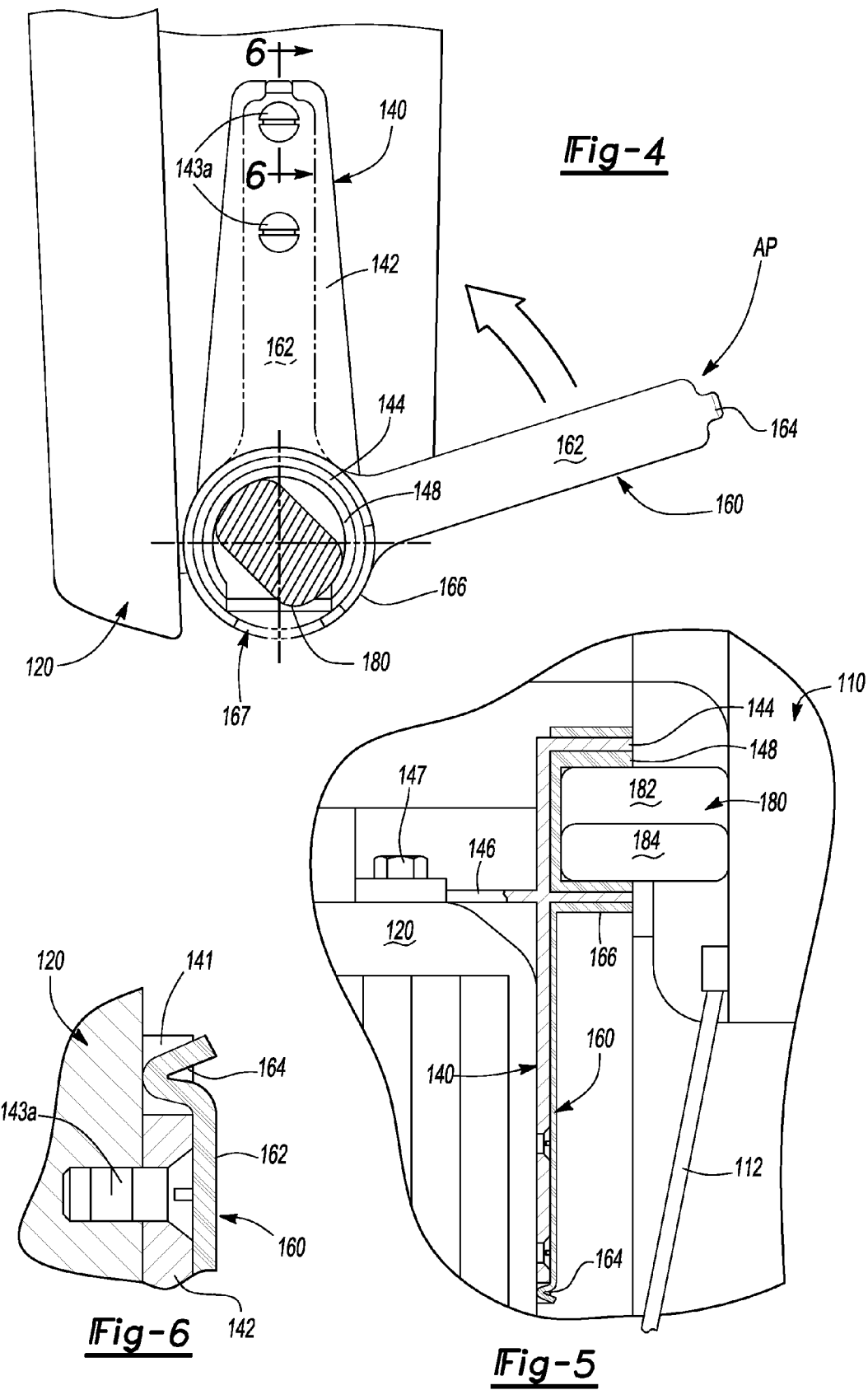

TAILGATE HINGE RETAINING MECHANISM

FIELD OF THE INVENTION

The present invention is related to a hinge retaining mechanism, and in particular, to a tailgate hinge retaining mechanism that prevents a tailgate of a pickup truck from inadvertently being removed from the pickup truck.

BACKGROUND OF THE INVENTION

Pickup trucks with tailgates are known. Such tailgates typically provide a vertical panel for a rearward end of a truck bed. In addition, such tailgates typically pivot between a closed position and an open position with the tailgate pivotally attached to a pair of truck bed posts using one or more trunnion hinges. Trunnion hinges typically have a pin that fits within a cup or sleeve that allows the tailgate to pivot or rotate between the closed position and the open position.

In some instances, removal of the tailgate from the truck bed is desired and such removal is typically afforded by a notch or slot in the cup which the pin can slide through. In addition, the pin has a pair of parallel flats that align with the notch or slot in the cup such that the tailgate can be pulled away and removed from the tailgate posts.

The position of the tailgate when it is removed from the bed posts can be intermediate between the opened position and the closed position. In addition, if the tailgate reaches such an intermediate position and an unintended lifting force is applied, the tailgate can be accidentally removed from the truck. Therefore, a tailgate hinge retaining mechanism that prevents a tailgate from unintentionally being removed from the bed of the truck, and yet allows an individual to remove the tailgate when desired, would be useful.

SUMMARY OF THE INVENTION

A tailgate hinge retaining mechanism for a truck bed having a tailgate post and a tailgate pivotally attached to the tailgate post is provided. The retaining mechanism can have a tailgate post bracket attached to the tailgate post and the post bracket can have an oblong pin extending therefrom. The tailgate can have a tailgate bracket attached thereto with the tailgate bracket having a first sleeve or cup extending therefrom and the first sleeve is dimensioned to fit over and pivot around the oblong pin. The first sleeve also has a first slot dimensioned to allow the oblong pin to slide therethrough and into the first sleeve. A retaining bracket is also included and attached to the tailgate bracket, the retaining bracket having a second sleeve dimensioned to fit over and rotate around the first sleeve. The second sleeve also has a second slot dimensioned to allow the oblong pin to slide therethrough and enter the first sleeve when the second slot is aligned with the first slot.

The oblong pin can have a pair of spaced apart flat slides, also known as a pair of parallel flats, and a pair of spaced apart arcuate ends. The pair of flat slides provides a pin width for the oblong pin and the pair of arcuate ends provides a pin diameter. In addition, the pin width is less than the pin diameter.

The first sleeve can be a cylindrically shaped sleeve that has a first inner diameter that is greater than the pin diameter such that the oblong pin can fit and rotate within the first sleeve and allow the tailgate to pivot between a tailgate closed position and a tailgate open position. In addition, the first slot of the first sleeve is greater than, i.e. has a width or opening that is greater than, the pin width and less than the pin diameter. As such, the first sleeve and the oblong pin can be operatively arranged such that the oblong pin cannot slide out of the first sleeve unless the pair of parallel flats is aligned with the first slot.

The first sleeve can also have an outer diameter, the second sleeve of the retaining bracket can have a second inner diameter that is greater than the first sleeve outer diameter and the second sleeve can be located on or around the first sleeve. In addition, the first sleeve and the second sleeve can be operatively arranged such that the retaining bracket rotates about the first sleeve of the tailgate bracket between a retaining position and an aligned position.

In some instances, the second slot of the second sleeve can be aligned with the first slot of the first sleeve when the retaining bracket is in the aligned position, and the second slot can be offset from the first slot when the retaining bracket is in the retaining position. Furthermore, when the second slot is aligned with the first slot, the second slot can be dimensioned such that it has an opening or width greater than the pin width, and as such, the oblong pin can slide through the second slot, through the first slot and into the first sleeve. It is appreciated that the oblong pin can slide through the slots and into the first sleeve when the pair of parallel flats is aligned with the slots since the first slot and second slot are greater than the pin width but less than the pin diameter.

After the oblong pin is within the first sleeve, the tailgate can be pivoted such that the pair of parallel flats do not align with the slots and thereby prevent the tailgate from being removed from the post bracket. In addition, the first sleeve, the second sleeve, and the oblong pin can be operatively arranged such that a portion of the second sleeve overlaps the first slot when the retaining bracket is in the retaining position and thus prevents the oblong pin from sliding through the first slot even when the pair of parallel flats is aligned therewith.

The retaining bracket can have a clip that engages the tailgate bracket when the retaining bracket is in the retaining position such that the retaining bracket stays in a fixed position relative to the tailgate bracket when the tailgate pivots between the tailgate closed position and the tailgate open position.

A process for releasably attaching a tailgate onto a truck bed is also provided. The process includes providing the truck with the truck bed, the tailgate, the tailgate bracket, and the retaining bracket discussed above and aligning the second slot of the retaining bracket with the first slot of the tailgate bracket. Thereafter, the tailgate is slid onto the post bracket such that the oblong pin slides through the second slot and the first slot, and the oblong pin is located within the first sleeve. The retaining bracket is then rotated about the tailgate bracket such that a portion of the second sleeve overlaps a portion of the first slot and the oblong pin is prevented from escaping the first sleeve.

BRIEF DESCRIPTION OF THE DRAWINGS

FIG. 4 is a side view of the tailgate hinge retaining mechanism shown in FIG. 3 and the retaining bracket in an aligned position AP;

FIG. 5 is a cross-sectional view of the tailgate hinge retaining mechanism shown in FIG. 4 with the tailgate in an open position;

FIG. 6 is a side cross-sectional view of section 6-6 shown in FIG. 4;

DETAILED DESCRIPTION OF THE PRESENT INVENTION

A tailgate hinge retaining mechanism that prevents undesirable disengagement between a tailgate bracket and a truck bed post bracket and yet allows for easy disengagement by an individual when desired is provided. As such, the tailgate hinge retaining mechanism has use as a component for a pickup truck.

The tailgate hinge retaining mechanism includes a retaining bracket that has an offset slot compared to a tailgate bracket that is attached to a tailgate of a pickup truck. The offset slot allows for the retaining bracket to prevent an oblong pin from escaping from the tailgate bracket attached to the tailgate when the retaining bracket is in a retaining position, and yet allows for the oblong pin to be removed from the tailgate bracket when the retaining bracket is in an aligned position.

The tailgate bracket has a sleeve that affords for the oblong pin to fit therewithin. In addition, the sleeve has a slightly larger dimension than the oblong pin such that the sleeve and the tailgate bracket can pivot or rotate about the oblong pin. In order to place the oblong pin within the sleeve, the sleeve can have a slot that allows the oblong pin to slide therewithin and enter into the sleeve. However, the retaining bracket, which fits around the sleeve of the tailgate bracket, can also have a slot that when aligned with the slot of the sleeve of the tailgate bracket allows the oblong pin to slide therethrough and into the tailgate bracket sleeve. But unlike prior art tailgate hinges, the slot of the retaining bracket can be offset with respect to the slot of the tailgate bracket, and as such, when the retaining bracket is placed in a retaining position after the oblong pin is located within the tailgate bracket sleeve, a portion of the retaining bracket extends over the slot of the tailgate bracket sleeve so that the oblong pin cannot slide through the slot thereof.

The retaining bracket can have a clip that engages the tailgate bracket when the retaining bracket is in the retaining position and affords for the retaining bracket to remain at a fixed position relative to the tailgate bracket during normal operation of the tailgate, i.e. during movement of the tailgate between an open position and a closed position. In this manner, undesirable removal or separation of the tailgate bracket from the oblong pin and its associated bed post bracket is prevented. In the alternative, when an individual desires to remove the tailgate from the truck bed, the individual can simply disengage the clip of the retaining bracket from the tailgate bracket and move the retaining bracket from the retaining position to an aligned position. While in the aligned position, the slot of the retaining bracket sleeve is aligned with the slot of the tailgate bracket sleeve which then provides an opening for the oblong pin to slide therethrough.

Figure 1:
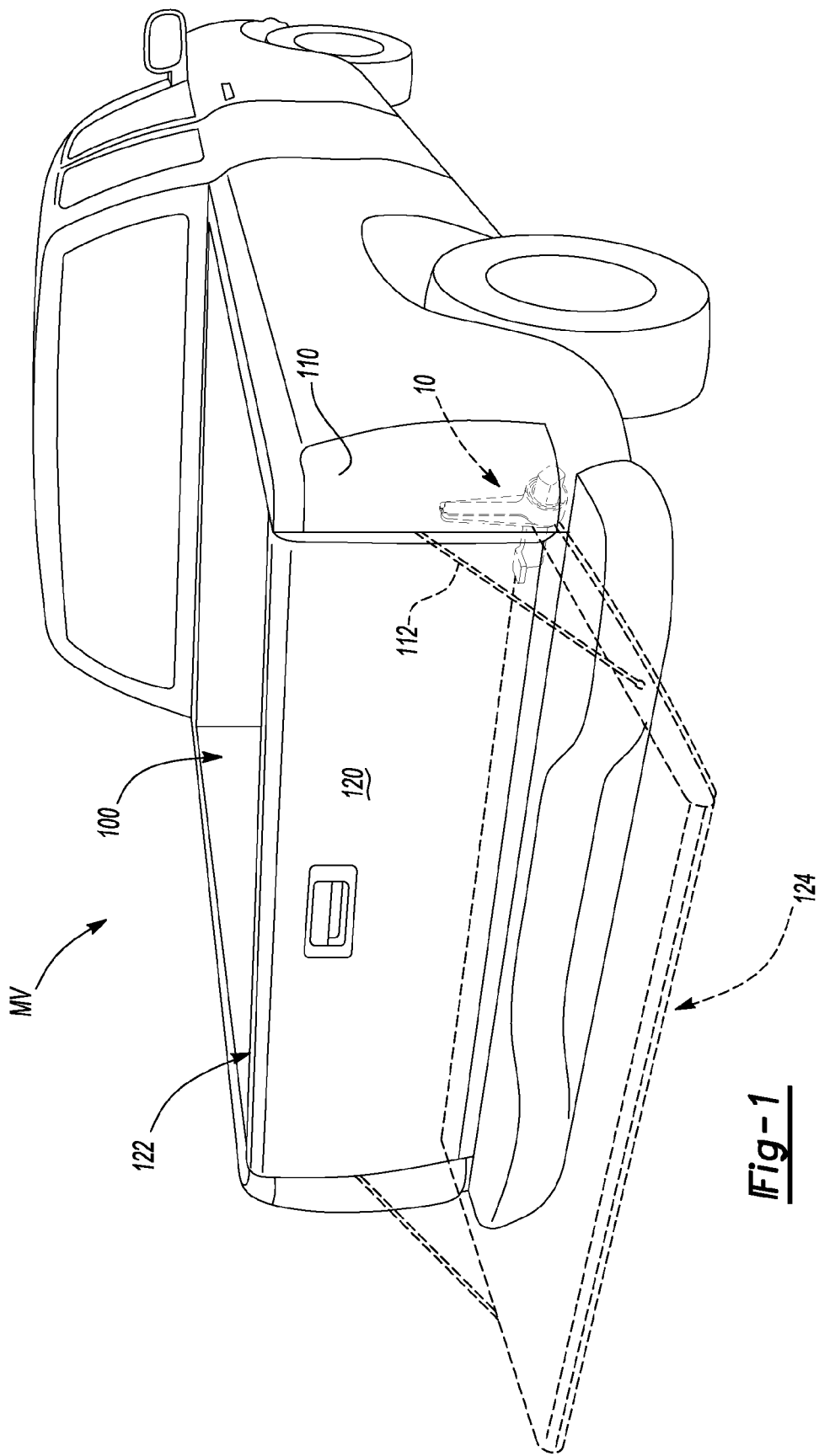
FIG. 1 is a perspective view of a pickup truck with a tailgate, a tailgate hinge and a tailgate hinge retaining mechanism according to an embodiment of the present invention.

Turning now to the figures, FIG. 1 illustrates a motor vehicle MV in the form of a pickup truck that has a tailgate hinge retaining mechanism shown generally at reference numeral 10. The retaining mechanism 10 and/or the motor vehicle MV can naturally include a truck bed 100 having at least one truck bed post 110 and a tailgate 120. The tailgate 120 can have a closed position 122 and an open position 124. In addition, a rope, chain, cable, etc. 112 can be attached to the post 110 and the tailgate 120 as is known to those skilled in the art in order to prevent the tailgate 120 from extending beyond a generally 90 degree orientation when in the open position 124 relative to the closed position 122.

Figure 2:
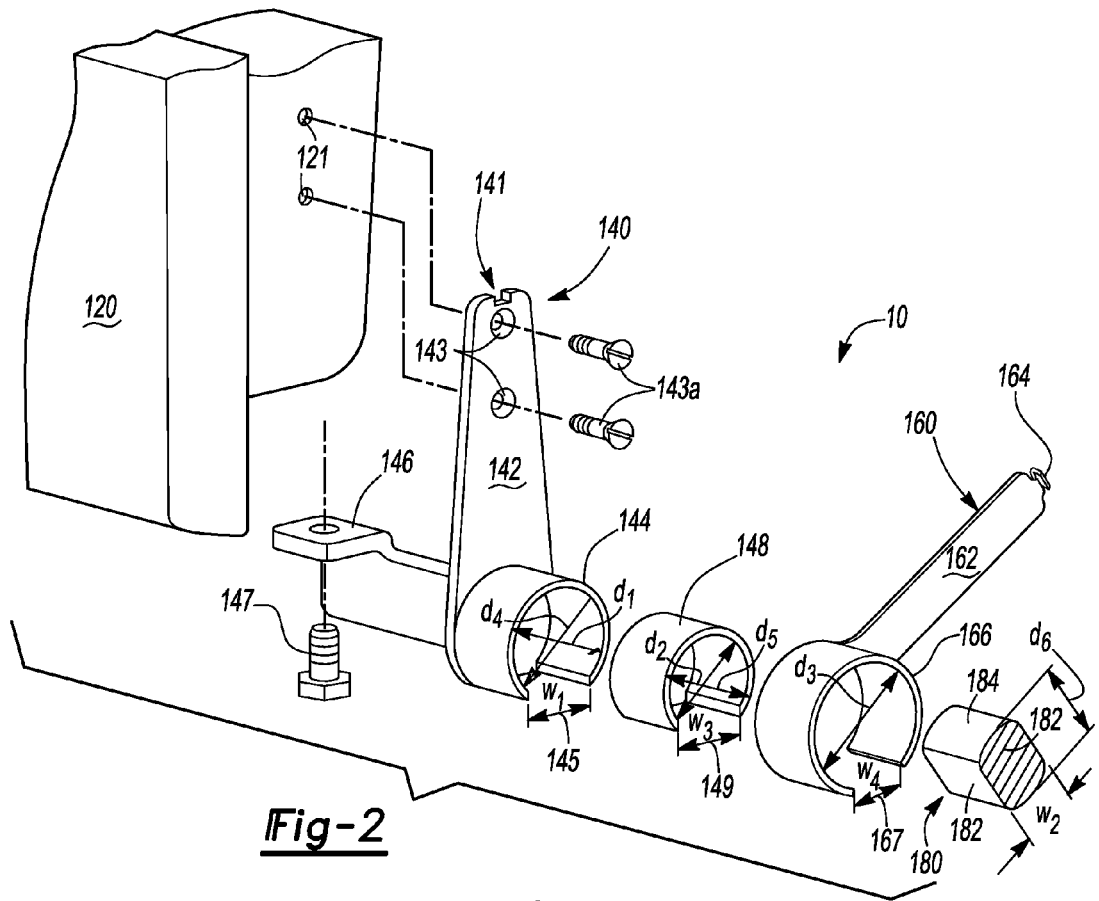
FIG. 2 is an exploded view of a tailgate hinge retaining mechanism according to an embodiment of the present invention.
Figure 3:
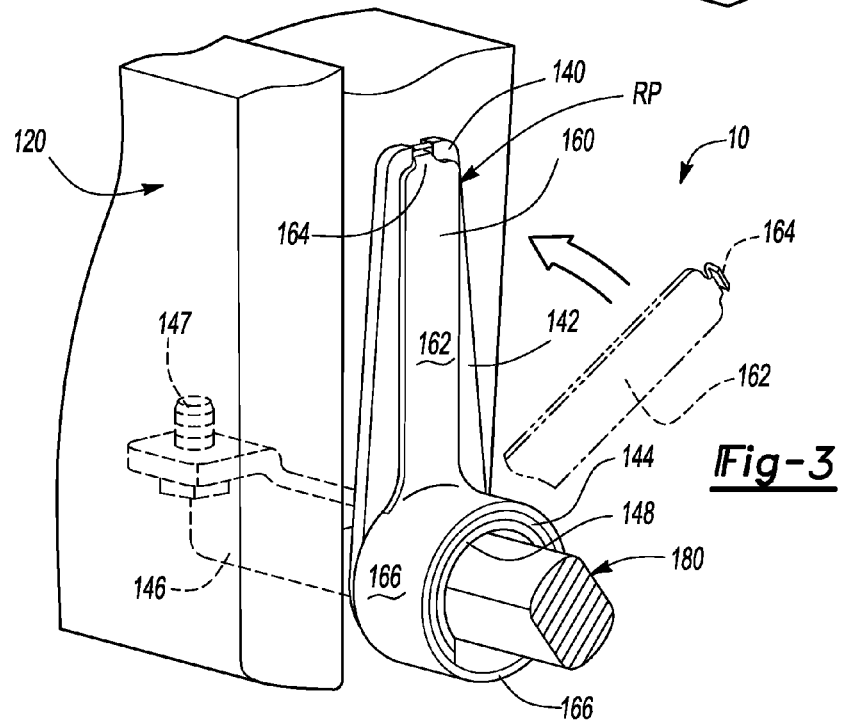
FIG. 3 is a perspective view of the tailgate hinge retaining mechanism shown in FIG. 2 after assembled and with a retaining bracket in a retaining position RP.

Turning now to FIGS. 2-4, an embodiment of the tailgate hinge retaining mechanism 10 is shown in greater detail. The mechanism 10 can include a tailgate bracket 140, a retaining bracket 160, and an oblong pin 180. It is appreciated that the oblong pin 180 is attached to a post bracket that is attached to the post 110, the post bracket holding the oblong pin 180 in a fixed and rigid position.

The tailgate bracket 140 can have an attachment bracket or flange 142 with one or more apertures 143 that afford for the bracket 140 to be attached to the tailgate 120 using threaded fasteners 143a. It is appreciated that the tailgate 120 can have complementary apertures 121, which may or may not have threads that engage threads of the threaded fasteners 143a. In addition, it is appreciated that the attachment member or flange 142 is complementary with the portion or location of the tailgate 120 where it is attached. Stated differently, the attachment member or flange 142 can be generally planar or have a contour shape depending upon the mating surface of the tailgate to which it is to be attached. The tailgate bracket 140 can also have an attachment flange 146 that in combination with a threaded fastener 147 allows for a separate attachment location between the tailgate bracket 140 and the tailgate 120 such that a structurally sound attachment of the bracket 140 to the tailgate 120 is provided.

The tailgate bracket 140 can also have a sleeve 144 extending from the attachment flange or member 142, the sleeve 144 extending in an outward direction relative to the tailgate 120. Stated differently, the sleeve 144 extends in a direction away from the tailgate 120. In some instances, an insert 148 can also be provided. For example, the insert 148 can be a plastic insert that can reduce vibration noise and/or provide a lubrication effect between the tailgate bracket 140 and the oblong pin 180. It is appreciated that the insert 148 is dimensioned to fit within the sleeve 144. As such, the sleeve 144 can have an inner diameter $d_1$ that is equal to or slightly larger than an outer diameter $d_2$ of the insert 148. In this manner, the insert 148 can fit within the sleeve 144 as shown in FIGS. 3 and 4.

The retaining bracket 160 can have a handle 162 and a sleeve 166 attached to and/or extending from the handle 162. The sleeve 166 can have an inner diameter $d_3$ that is equal to or slightly larger than an outer diameter $d_4$ of the sleeve 144. As such, the sleeve 166 can slide over and fit onto the sleeve 144 as shown in FIGS. 3 and 4.

The sleeve 144 can have a slot 145 having a width $w_1$ that is slightly larger than the width $w_2$ of the oblong pin 180. It is appreciated that the oblong pin 180 can have a pair of spaced apart flat sides 182 which can be generally parallel to each other and a pair of spaced apart arcuate ends 184. The pair of arcuate ends 184 can each have a radius of curvature that provides for the oblong pin 180 to have a diameter dimension. Stated differently, the short or width dimension $w_2$ is provided by the pair of parallel flats 182 and a diameter $d_6$ is provided by the pair of arcuate ends 184. It is appreciated from FIGS. 3 and 4 that the oblong pin once located within the sleeve 144 can act or serve as an axis of rotation for which the sleeve 144, the attached member 142, and thus the tailgate 120 can pivot about.

The insert 148 and the retaining bracket 160 can have a slot 149 and 167, respectively. It is appreciated that the slots 149 and 167 can also have a width $w_3$, $w_4$, respectively, that is greater than the width $w_2$ of the oblong pin 180, and as such allows for the pin to slide therethrough when the pair of parallel flats 182 is aligned with the slots. For the purposes of the present invention, it is appreciated that the term or the usage of the language "the pair of parallel flats is aligned with the slot" refers to orientation of the oblong pin relative to the slot 145 such that the oblong pin 180 can slide through the slot 145 and enter into the sleeve 144. It is appreciated and known to those skilled in the art that if the oblong pin 180 is not aligned properly with the slot 145, and with the slot 145 being greater than the width $w_2$ of the oblong pin 180 but less than the diameter $d_6$ of the pin 180, then the pin 180 will not slide through the slot 145. It is also known to those skilled in the art that the oblong pin 180 can be oriented at a generally 45 degree angle relative to horizontal and that a tailgate can likewise be held at an approximate 45 degree angle in order to slide the sleeve 144 over the oblong pin 180 to install or assemble the tailgate 120 onto the motor vehicle MV.

As shown in FIG. 4, the retaining bracket 160 can have an open or aligned position AP such that the slot 167 is aligned with the slot 145 and an opening is afforded for the oblong pin 180 to slide therethrough and enter into the sleeve 144 and insert 148. As such, during installation or assembly of the motor vehicle MV, the retaining bracket 160 can be located on or over the sleeve 144 and placed in the open or aligned position AP as shown in FIG. 4 and the tailgate can be attached to the truck bed by sliding sleeve 144 over the oblong pin 180. Thereafter, the retaining bracket 160 can be moved to a closed or retaining position RP as shown in FIG. 3, and with the slot 167 being offset from the slot 145, a portion of the retaining bracket sleeve 166 covers or overlaps the opening provided by the slot 145 and prevents the oblong pin 180 from being removed from the sleeve 144.

The retaining bracket 160 can have a clip 164 that is complementary with a notch 141 of the tailgate bracket 140 such that when the retaining bracket 160 is moved or present in the retaining position RP the clip 164 engages the tailgate bracket 140 and the retaining bracket 160 stays fixed in its orientation relative to the tailgate bracket 140 during operation of the tailgate 120. Thus during normal operation of the tailgate 120, i.e. when moved from the closed position 122 to the open position 124 and therebetween, the retaining bracket 160 moves with the tailgate bracket 140 and continues to cover the opening provided by the slot 145 and prevent the oblong pin 180 from sliding therethrough.

In the event that the tailgate 120 is desired to be removed or separated from the motor vehicle MV, an individual can move the retaining bracket 160 from the retaining position RP shown in FIG. 3 back to the aligned position AP shown in FIG. 4 and with the tailgate 120 held at a generally 45 degree angle, the sleeve 144 can slide off of the oblong pin 180 as is known to those skilled in the art.

As shown in FIG. 6, the clip 164 can be a generally V-shaped clip that would allow an individual to disengage the clip from the notch 141. However, a generally V-shaped clip is not required and any type of clip, snap, hook-and-loop fastener, and the like that affords for releasable attachment of the retaining bracket 160 to the tailgate bracket 140 and/or the tailgate 120 can be used.

Figure 7:
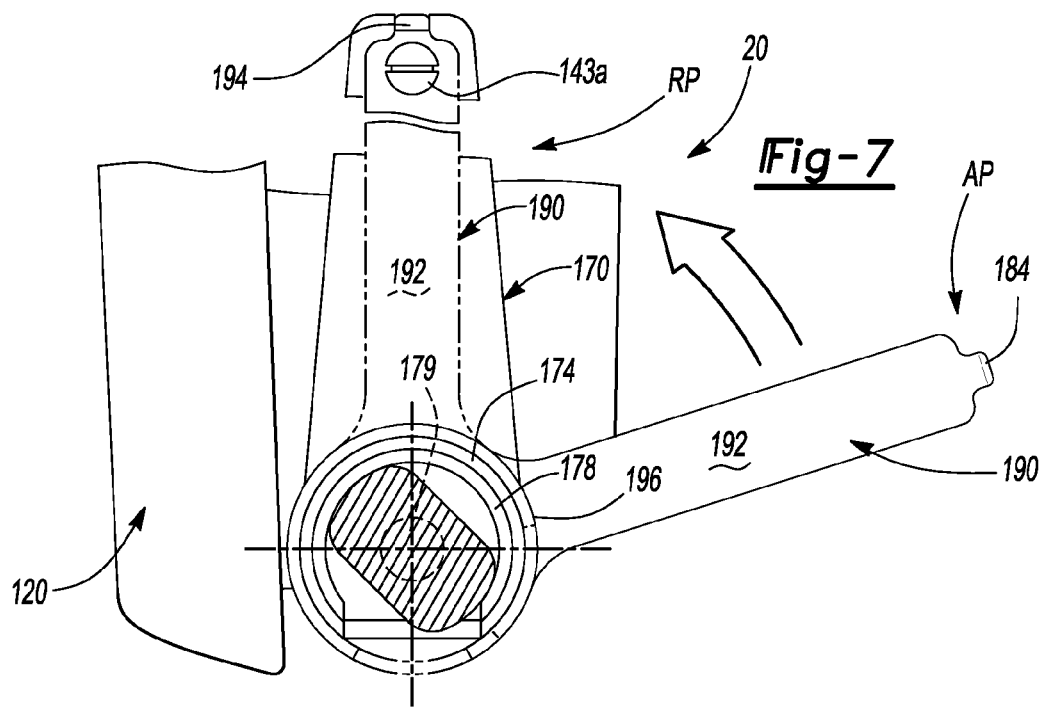
FIG. 7 is a side view of a tailgate hinge retaining mechanism according to another embodiment of the present invention.
Figure 8:
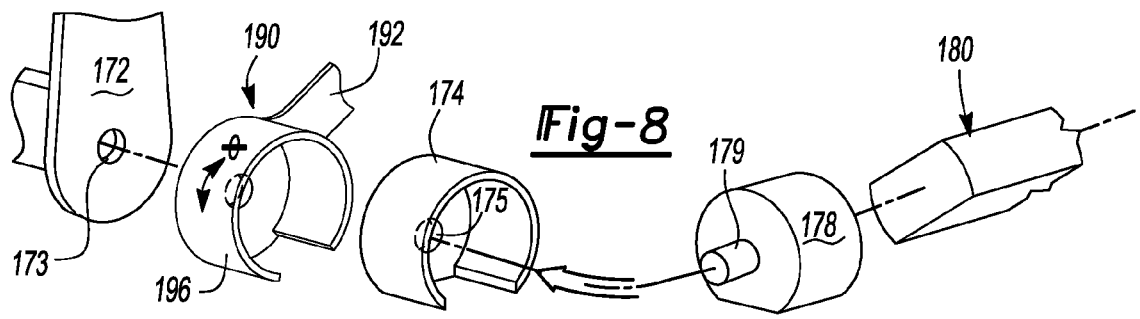
FIG. 8 is an exploded view of a portion of the tailgate hinge retaining mechanism shown in FIG. 7.
Figure 9:
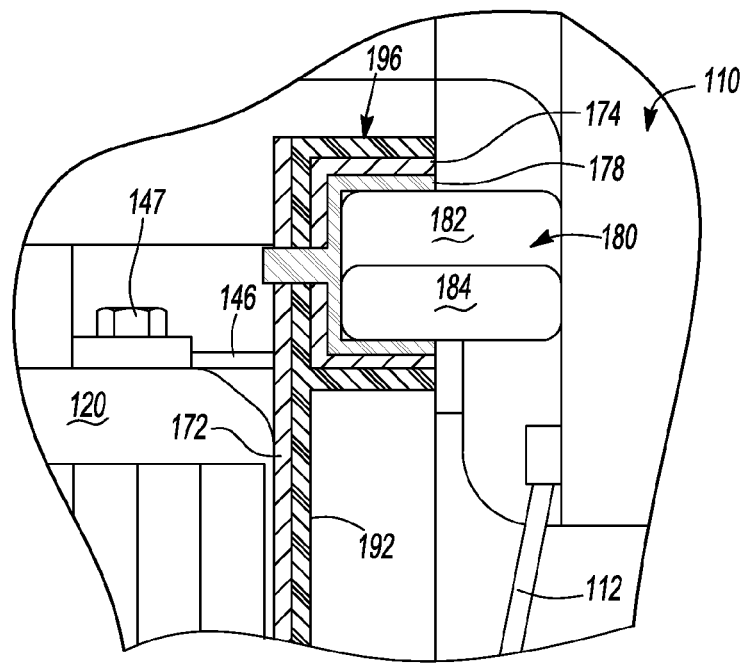
FIG. 9 is a cross-sectional view of the tailgate hinge retaining mechanism shown in FIG. 7 with the tailgate in an open position.

Looking now at FIGS. 7-9, where similar reference numerals refer to similar components in the prior figures, another embodiment of the tailgate hinge retaining mechanism is shown generally at reference numeral 20. The mechanism 20 has a tailgate bracket 170 that is similar to tailgate bracket 140 except that the sleeve 174 is spaced apart from the attachment member or flange 172 and a retaining bracket 190 is located or sandwiched between the attachment member or flange 172 and the sleeve 174. For example, an insert 178 can have a shaft 179 that fits within an aperture 175 of the sleeve 174 and an aperture 173 of the member 172. The retaining bracket 190 has a sleeve 196 that fits over or onto the sleeve 174 and allows for the retaining bracket 190 to move from and between an aligned position AP and a retaining position RP (in phantom) as shown in phantom in FIG. 7.

It is appreciated that the above described embodiments are for illustrative purposes only and that a number of modifications, changes, and the like will be apparent to those skilled in the art. Such changes and modifications are known to be within the scope of the invention since the scope is covered by the claims and equivalents thereof.

I claim:

1. A tailgate hinge retaining mechanism comprising:
 a truck bed having a tailgate post and a tailgate pivotally attached to said tailgate post;
 an oblong pin extending from said tailgate post;
 said tailgate having a tailgate bracket attached thereto, said tailgate bracket having a first sleeve extending therefrom, said first sleeve dimensioned to fit over and pivot around said oblong pin, said first sleeve also having a first slot dimensioned to allow said oblong pin to slide into said first sleeve;
 a retaining bracket attached to said tailgate bracket and having a second sleeve dimensioned to fit over and rotate around said first sleeve, a handle extending from said second sleeve, and said second sleeve having a second slot dimensioned to allow said oblong pin to slide therethrough and enter said first sleeve when said second slot is aligned with said first slot: and
 a clip on a terminal end of said handle, said clip engaged with said tailgate bracket and said clip maintaining said retaining bracket in a fixed position relative to said tailgate bracket.

2. The tailgate hinge retaining mechanism of claim 1, wherein said oblong pin has a pair of spaced apart flat sides and a pair of spaced apart arcuate ends, said pair of flat sides providing a pin width and said pair of arcuate ends providing a pin diameter, said pin width being less than said pin diameter.

3. The tailgate hinge retaining mechanism of claim 2, wherein said first sleeve is a cylindrically shaped sleeve having a first inner diameter, said first inner diameter greater than said pin diameter such that said oblong pin and said first sleeve are operatively arranged to allow said tailgate to pivot between a tailgate closed position and a tailgate open position.

4. The tailgate hinge retaining mechanism of claim 3, wherein said first slot is greater than said pin width and less than said pin diameter, said first sleeve and said oblong pin operatively arranged such that said oblong pin cannot slide out of said first sleeve unless said pair of spaced apart flat sides are aligned with said first slot.

5. The tailgate hinge retaining mechanism of claim 4, wherein said first sleeve has an outer diameter and said second sleeve has a second inner diameter greater than said outer diameter of said first sleeve, said first sleeve and said second sleeve operatively arranged such that said retaining bracket rotates about said first sleeve of said tailgate bracket between a retaining position and an aligned position.

6. The tailgate hinge retaining mechanism of claim 5, wherein said second slot of said second sleeve is aligned with said first slot of said first sleeve when said retaining bracket is in said aligned position and offset from said first slot when said retaining bracket is in said retaining position.

7. The tailgate hinge retaining mechanism of claim 6, wherein said second slot is greater than said pin width, and said first sleeve, said second sleeve and said oblong pin are operatively arranged such that said oblong pin can slide through said first slot, said second slot and into said first sleeve when said retaining bracket is in said aligned position and said pair of spaced apart flat sides are aligned with said first slot.

8. The tailgate hinge retaining mechanism of claim 7, wherein said first sleeve, said second sleeve and said oblong pin are operatively arranged such that a portion of said second sleeve overlaps said first slot when said retaining bracket is in said retaining position and said oblong pin cannot slide through said first slot when said pair of spaced apart flat sides are aligned with said first slot.

9. The tailgate hinge retaining mechanism of claim 8, wherein said clip engaged with said tailgate bracket when said retaining bracket is in said retaining position such that said retaining bracket is in a fixed position relative to said tailgate bracket when said tailgate pivots between said tailgate closed position and said tailgate open position.

10. A tailgate hinge retaining mechanism comprising:
a truck bed having a tailgate post and a tailgate pivotally attached to said tailgate post;
an oblong pin extending from said tailgate post a predetermined length, said oblong pin having a pin width;
said tailgate having a tailgate bracket attached thereto and pivotally engaged with said oblong pin, said tailgate bracket having a cylindrically shaped first sleeve extending therefrom, said first sleeve dimensioned to fit over and pivot around said oblong pin and allow said tailgate to pivot between a tailgate open position and a tailgate closed position, said first sleeve also having a first slot dimensioned for said pin width of said oblong pin to slide therethrough and allow said oblong pin to slide into and out of said first sleeve;
a retaining bracket pivotally attached to said tailgate bracket and having a cylindrically shaped second sleeve dimensioned to fit over and pivot around said first sleeve, a handle extending from said second sleeve, and said second sleeve also having a second slot dimensioned for said width of said oblong pin to slide therethrough and allow said oblong pin to slide into said first sleeve when said retaining bracket is in an aligned position and said second slot is aligned with said first slot;
said second slot also offset from said first slot when said retaining bracket is in a retaining position such that a portion of said second sleeve overlaps said first slot and prevents said oblong pin from sliding out of said first sleeve: and
a clip on a terminal end of said handle, said clip engaged with said tailgate bracket when said retaining bracket is in said retaining position such that said retaining bracket is in a fixed position relative to said tailgate bracket when said tailgate pivots between said tailgate closed position and said tailgate open position.

11. The tailgate hinge retaining mechanism of claim 10, wherein said oblong pin has a pair of spaced apart flat sides and a pair of spaced apart arcuate ends, said pair of flat sides providing said pin width and said pair of arcuate ends providing a pin diameter, said pin width being less than said pin diameter.

12. The tailgate hinge retaining mechanism of claim 11, wherein said first sleeve has a first inner diameter, said first inner diameter greater than said pin diameter such that said tailgate bracket is operatively arranged for said tailgate to pivot between said tailgate closed position and said tailgate open position.

13. The tailgate hinge retaining mechanism of claim 12, wherein said first sleeve has an outer diameter and said second sleeve has a second inner diameter greater than said outer diameter of said first sleeve, said first sleeve and said second sleeve operatively arranged such that said retaining bracket rotates about said first sleeve of said tailgate bracket when said tailgate pivots between said tailgate closed position and said tailgate open position.

14. The tailgate hinge retaining mechanism of claim 13, wherein said second slot of said second sleeve is aligned with said first slot of said first sleeve when said retaining bracket is in said aligned position and offset from said first slot when said retaining bracket is in said retaining position.

15. The tailgate hinge retaining mechanism of claim 14, wherein said second slot is greater than said pin width, and said first sleeve, said second sleeve and said oblong pin are operatively arranged such that said oblong pin can slide through said first slot, said second slot and into said first sleeve when said retaining bracket is in said aligned position and said pair of spaced apart flat sides are aligned with said first slot.

16. The tailgate hinge retaining mechanism of claim 15, wherein said first sleeve, said second sleeve and said oblong pin are operatively arranged such that a portion of said second sleeve overlaps said first slot when said retaining bracket is in said retaining position and said oblong pin cannot slide through said first slot when said pair of spaced apart flat sides are aligned with said first slot.

17. A process for releasably attaching a tailgate onto a truck bed, the process comprising:
providing a truck with a truck bed, the truck bed having a bed post with an oblong pin having a width dimension, a length dimension;
providing a tailgate having a tailgate bracket attached thereto, the tailgate bracket having a first sleeve extending therefrom, the first sleeve dimensioned for the oblong pin to fit and pivot therewithin, the first sleeve also having a first slot dimensioned for the width dimension of the oblong pin to slide therethrough and be located within said first sleeve;
providing a retaining bracket having a second sleeve, the second sleeve dimensioned to fit over and rotate about the first sleeve, a handle extending from said second sleeve, and the second sleeve also having a second slot offset from the first slot and dimensioned for the width dimension of the oblong pin to slide therethrough and be located within the first sleeve when the second slot is aligned with the first slot;
providing a clip on a terminal end of the handle engaged with the tailgate bracket such that the retaining bracket is fixed relative to the tailgate bracket when the tailgate moves between a tailgate closed position and a tailgate open position:
attaching the retaining bracket onto the tailgate bracket and aligning the second slot with the first slot;
sliding the tailgate onto the oblong pin such that the oblong pin slides through the second slot and the first slot and is located within the first sleeve; and rotating the retaining bracket about the tailgate bracket such that a portion of the second sleeve overlaps a portion of the first slot and the oblong pin is prevented from escaping the first sleeve.

18. The process of claim 17, further including disengaging the clip from the tailgate bracket, aligning the second slot with the first slot, sliding the oblong pin through the aligned second slot and first slot, and removing the tailgate from the truck.

19. The tailgate hinge retaining mechanism of claim 1, wherein said clip is integral with said terminal end of said handle.

* * * * *